(12) United States Patent
Qian et al.

(10) Patent No.: US 8,253,870 B2
(45) Date of Patent: Aug. 28, 2012

(54) LIQUID CRYSTAL DISPLAY SCREEN

(75) Inventors: Li Qian, Beijing (CN); Liang Liu, Beijing (CN); Chen Feng, Beijing (CN)

(73) Assignee: Beijing FUNATE Innovation Technology Co., Ltd., Beijing (CN)

( * ) Notice: Subject to any disclaimer, the term of this patent is extended or adjusted under 35 U.S.C. 154(b) by 114 days.

(21) Appl. No.: 12/964,919

(22) Filed: Dec. 10, 2010

(65) Prior Publication Data

US 2011/0292311 A1 Dec. 1, 2011

(30) Foreign Application Priority Data

May 31, 2010 (CN) .......................... 2010 1 0187834

(51) Int. Cl.
*G02F 1/1335* (2006.01)
(52) U.S. Cl. ............................................ 349/12; 349/96
(58) Field of Classification Search .................... 349/12, 349/96
See application file for complete search history.

(56) References Cited

U.S. PATENT DOCUMENTS

| 2008/0029292 A1 | 2/2008 | Takayama et al. |
| 2009/0153503 A1 | 6/2009 | Jiang et al. |
| 2009/0153514 A1 | 6/2009 | Jiang et al. |
| 2009/0160798 A1 | 6/2009 | Jiang et al. |

FOREIGN PATENT DOCUMENTS

| CN | 201097040 Y | 8/2008 |
| CN | 201218888 Y | 4/2009 |
| CN | 201233481 Y | 5/2009 |
| CN | 101458593 A | 6/2009 |
| CN | 101458603 A | 6/2009 |
| CN | 101464765 A | 6/2009 |
| CN | 101587410 A | 11/2009 |

OTHER PUBLICATIONS

Kazuhiro Noda, Kohtaro Tanimura, Production of Transparent Conductive Films with Inserted SiO2 Anchor Layer, and Application to a Resistive Touch Panel, Electronics and Communications in Japan, No. 7, 2001, p. 39-45, vol. 84.

Li Shuben, Wang Qindi, Ji Jianhua, Study of Continuous Coating Capacitive Touch Panels, Optoelectronic Technology in China, vol. 15, No. 1, Mar. 1995, p. 62-67.

*Primary Examiner* — Phu Vu
(74) *Attorney, Agent, or Firm* — Altis Law Group, Inc.

(57) ABSTRACT

A liquid crystal display screen is provided. The liquid crystal display screen includes a capacitance type touch panel, an upper board, a liquid crystal layer, and a lower board. The capacitance type touch panel includes a substrate and a transparent conductive layer located on the substrate. The upper board includes an upper substrate, an upper electrode, and an upper alignment layer. The transparent conductive layer is configured to be an upper optical polarizer. The transparent conductive layer is a carbon nanotube layer having an anisotropic conductivity. The upper substrate is the substrate of the capacitance type touch panel.

20 Claims, 5 Drawing Sheets

LIQUID CRYSTAL DISPLAY SCREEN

RELATED APPLICATIONS

This application claims all benefits accruing under 35 U.S.C. §119 from China Patent Application No. 201010187834.X, filed on May 31, 2010 in the China Intellectual Property Office, the disclosure of which is incorporated herein by reference.

BACKGROUND

1. Technical Field

The present disclosure relates to liquid crystal display screens and, in particular, to a liquid crystal display screen having a touch panel.

2. Discussion of Related Art

A liquid crystal display equipped with a capacitance type touch panel includes a capacitance touch panel, an upper optical polarizer, an upper substrate, an upper alignment layer, a liquid crystal layer, a lower alignment layer, a thin-film transistor panel, and a lower optical polarizer in sequence. The capacitance touch panel from front to back includes an upper substrate, an upper indium tin oxide layer, a lower substrate, and a lower indium tin oxide layer in sequence. The lower indium tin oxide layer is located on the upper optical polarizer.

However, the capacitance touch panel equipped in the liquid crystal display can increase the thickness of the liquid crystal display. Thus, the structure of the liquid crystal display can be complicated.

What is needed, therefore, is to provide a liquid crystal display screen, to overcome the above-described shortcomings.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings. It should be noted that references to "an" or "one" embodiment in this disclosure are not necessarily to the same embodiment, and such references mean at least one.

Figure 1:
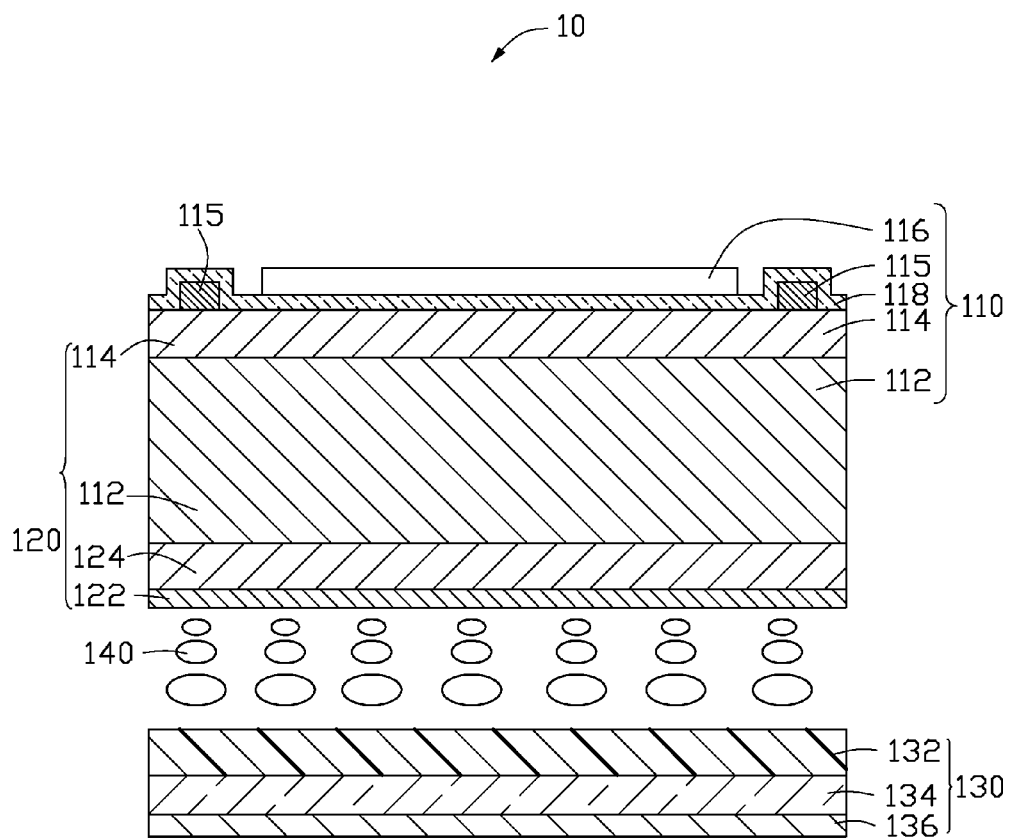
FIG. 1 is a cross sectional view of one embodiment of a liquid crystal display screen.
Figure 2:
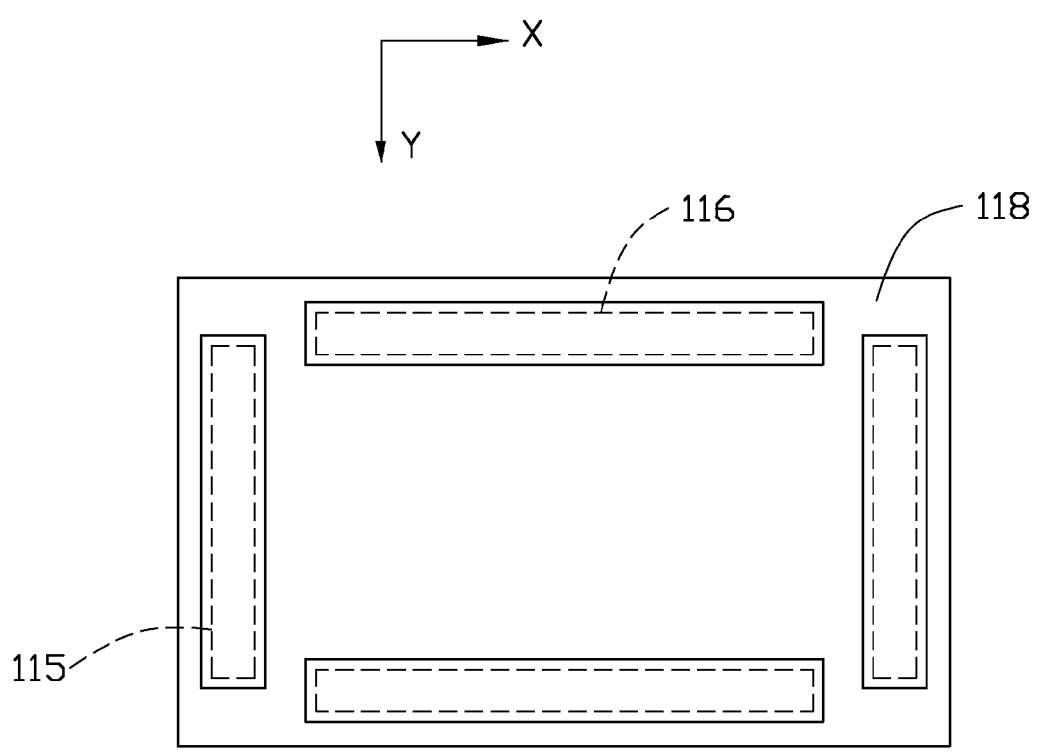
FIG. 2 is a top view of the liquid crystal display screen shown in FIG. 1.

Referring to FIG. 1 and FIG. 2, one embodiment of a liquid crystal display screen 10 is provided. The liquid crystal display screen 10 includes a capacitance touch panel 110, an upper board 120, a lower board 130, and a liquid crystal layer 140 sandwiched between the upper board 120 and the lower board 130. In this connection, the term "upper," "top," "lower," and "bottom" only indicate relative position or direction.

The touch panel 110 can be a surface conductive capacitance type touch panel. The touch panel 110 includes an upper substrate 112, a transparent conductive layer 114, two first electrodes 115, two second electrodes 116, and a transparent protective layer 118. The transparent conductive layer 114 is located on an upper surface of the upper substrate 112. The two first electrodes 115 and the two second electrodes 116 are electrically connected to the transparent conductive layer 114. The transparent protective layer 118 can be located on an upper surface of the transparent conductive layer 114 to protect the transparent conductive layer 114.

The upper board 120 includes the transparent conductive layer 114, the upper substrate 112, an upper electrode 124, and an upper alignment layer 122, from top to bottom. The upper alignment layer 122 is adjacent to the liquid crystal layer 140. The transparent conductive layer 114 of the touch panel 110 can also be used as an upper optical polarizer of the upper board 120. The upper substrate 112 of the upper board 120 can also be used as a substrate of the touch panel 110 to support the transparent conductive layer 114. Thus, in the liquid crystal display screen 10, the upper substrate 112 is a common substrate of the touch panel 110 and the upper board 120. The upper substrate 112 can be the only substrate configured to support the transparent conductive layer 114 in the upper board 120. Simultaneously, the transparent conductive layer 114 can be the only optical polarizer in the upper board 120 to polarize the light emitted from a back-light unit disposed under the liquid crystal display screen 10 and achieve a polarized light. The substrate of the touch panel 110 and the upper optical polarizer of the upper board 120 can be omitted. Thus, a thickness of the liquid crystal display screen 10 can be decreased, a structure of the liquid crystal display screen 10 can be simplified, and the process of fabricating the liquid crystal display screen 10 can be simplified. The cost of the liquid crystal display screen 10 can be reduced. The liquid crystal display screen 10 can also improve a utilization efficiency of a backlight module, further improving display quality.

From top to bottom in sequence, the lower board 130 includes a lower alignment layer 132, a thin film transistor panel 134, and a lower optical polarizer 136. The lower alignment layer 132 is adjacent to the liquid crystal layer 140.

It can be understood that a desired layer can be inserted into two adjacent of the above-mentioned layers of the liquid crystal display screen 10, according to a function demand.

The upper substrate 112 can be a transparent and flexible film or a transparent and flexible plate. The upper substrate 112 can be made of glass, diamond, quartz, or any other suitable rigid material. If the touch panel 110 is a flexible touch panel, the upper substrate 112 can be made of plastic, resin, or any other suitable flexible material, such as polycarbonate (PC), polymethyl methacrylate acrylic (PMMA), polyethylene terephthalate (PET), polyether polysulfones (PES), polyvinyl polychloride (PVC), benzocyclobutenes (BCB), polyesters or acrylic resins. A thickness of the upper substrate 112 can be in a range from about 1 millimeter to about 1 centimeter. In one embodiment, the upper substrate 112 is made of glass and has a thickness of about 5 millimeters.

The transparent conductive layer 114 can be a carbon nanotube layer with a certain transparency. The carbon nanotube layer is an anisotropic conductive layer. The carbon nanotube layer includes a plurality of carbon nanotubes extending substantially along a same direction. Thus, the resistant conductivity of the carbon nanotube layer along the extending direction can be less than the resistant conductivities of the carbon nanotube layer along other directions. The extending direction is substantially parallel to a surface of the carbon nanotube layer. In one embodiment, a resistant conductivity ratio of the resistant conductivity of the carbon nanotube layer along the extending direction and the resistant conductivity of the carbon nanotube layer along other directions are less than 1 to 2. The carbon nanotube layer includes at least one carbon nanotube film. In one embodiment, the carbon nanotube layer includes a plurality of carbon nanotube films stacked over each other or substantially parallel to each other, and nearly without spaces therebetween. Most carbon nanotubes in the plurality of carbon nanotube films are substantially arranged along a same direction, that is, the carbon nanotubes in two adjacent carbon nanotube films are substantially arranged along the same direction. In one embodiment, the transparent conductive layer 114 consists of a single carbon nanotube film. The transparency of the single carbon nanotube film can be greater than or equal to 85%. The thickness of the carbon nanotube layer can be from about 0.5 nanometers to about 100 micrometers. In one embodiment, the thickness of the carbon nanotube layer is from about 100 nanometers to about 200 nanometers.

Figure 3:
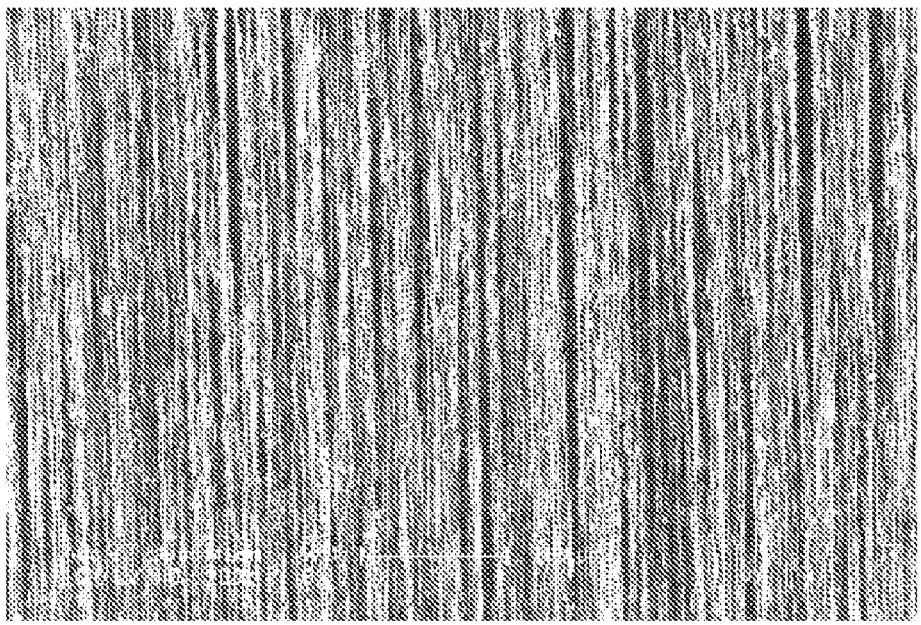
FIG. 3 shows a Scanning Electron Microscope (SEM) image of a carbon nanotube film.

Referring to FIG. 3, in the carbon nanotube film, the carbon nanotubes are substantially oriented along a same preferred orientation and approximately parallel to each other. In this connection, the term "approximately" or "substantially" as used herein means that it is impossible and unnecessary that each of the carbon nanotubes in the carbon nanotube films be exactly parallel to one another, because in the course of fabricating the carbon nanotube film, some factor such as the change of drawing speed and non-uniform drawing force on the carbon nanotube film when the carbon nanotube film is drawn from a carbon nanotube array affects the orientations of the carbon nanotubes. A film can be drawn from a carbon nanotube array, to form the ordered carbon nanotube film, namely a carbon nanotube film. Examples of carbon nanotube film are taught by U.S. Pat. No. 7,045,108 to Jiang et al. The carbon nanotube film includes a plurality of successive and oriented carbon nanotubes joined end-to-end by van der Waals attractive force therebetween. The carbon nanotube film is a free-standing film. The carbon nanotube film can be treated with an organic solvent to increase the mechanical strength and toughness of the carbon nanotube film and reduce the coefficient of friction of the carbon nanotube film. A thickness of the carbon nanotube film can range from about 0.5 nm to about 100 μm.

A method of making a carbon nanotube film includes providing an array of carbon nanotubes and pulling out a carbon nanotube film from the array of carbon nanotubes. Pulling can be aided by the use of a tool such as adhesive tape, pliers, tweezers, or other tools allowing multiple carbon nanotubes to be gripped and pulled simultaneously. The carbon nanotube film can be formed by selecting one or more carbon nanotubes having a predetermined width from the array of carbon nanotubes and pulling the carbon nanotubes at a substantially uniform speed to form carbon nanotube segments that are joined end to end to achieve a uniform carbon nanotube film.

The carbon nanotube segments can be selected by using the tool allowing multiple carbon nanotubes to be gripped and pulled simultaneously to contact the array of carbon nanotubes. The pulling direction can be substantially perpendicular to the growing direction of the array of carbon nanotubes.

More specifically, during the pulling process, as the initial carbon nanotube segments are drawn out, other carbon nanotube segments are also drawn out end to end due to van der Waals attractive force between ends of adjacent segments. This process of pulling produces a substantially continuous and uniform carbon nanotube film having a predetermined width can be formed. If the angle between the aligned directions of the carbon nanotubes in adjacent carbon nanotube films is larger than 0 degrees, a microporous structure is defined by the carbon nanotubes. The carbon nanotube structure in an embodiment employing these films will have a plurality of micropores. The micropores have diameters which can range from about 1 nm to about 0.5 mm. Stacking the carbon nanotube films will also add to the structural integrity of the carbon nanotube structure.

Understandably, the carbon nanotube film structure may further include at least two stacked carbon nanotube films. Additionally, when the carbon nanotubes in the carbon nanotube film are aligned along one preferred orientation (e.g., the carbon nanotube film), an angle can exist between the orientation of carbon nanotubes in adjacent films. Adjacent carbon nanotube films can be combined by only the van der Waals attractive force therebetween. The number of the layers of the carbon nanotube films is not limited as long as the carbon nanotube structure. However the thicker the carbon nanotube structure, the smaller the specific surface area.

The carbon nanotube layer can include a reinforcement material and the at least one above mentioned carbon nanotube film. The reinforcement material is substantially uniformly infiltrated on the at least one carbon nanotube to form a carbon nanotube composite film. The reinforcement material can be a transparent polymer material or metal. The transparent polymer material can be polycarbonate (PC), polymethyl methacrylate acrylic (PMMA), polyethylene terephthalate (PET), benzocyclobutenes (BCB), polystyrene, polyethylene, polycarbonate, polycycloolefins, and any other suitable materials. The metal can be nickel, gold, platinum, iron, cobalt, copper, and any other suitable materials.

It can be understood the carbon nanotube layer can be treated with a laser to form a plurality of laser cutting lines. Thus, the resistant conductivity of the carbon nanotube layer can be improved.

Because the transparent conductive layer 114 is the carbon nanotube layer. The carbon nanotubes in the carbon nanotube layer can have uniform absorption ability in the entire electromagnetic wavelength region, the transparent conductive layer 114 has a uniform polarization property in the entire electromagnetic wavelength region. When light beams are transmitted into the transparent conductive layer 114 including oriented carbon nanotubes along a same direction, the light beams having a polarization parallel to the carbon nanotubes are substantially absorbed by the carbon nanotubes, and the light beams having a polarization normal to the carbon nanotubes are transmitted through the transparent conductive layer 114. Therefore, the transparent conductive layer 114 not only can have electrical conductivity property, but also can have polarization properties. The transparent conductive layer 114 can function as the upper optical polarizer. Thus, the upper optical polarizer is not needed. The resulting liquid crystal display screen 10 is thinner and requires fewer elements, but retains the same function.

The two first electrodes 115 and the two second electrodes 116 are separately located on the transparent conductive layer 114 to form equipotential lines. An axis from one of the two first electrodes 114 across the transparent conductive layer 114 to the other first electrode 115 is defined as a first axis. The first axis is an X axis as shown in FIG. 2. The carbon nanotubes in the transparent conductive layer 114 substantially extended along the X axis. Another axis from one of the two second electrodes 116 across the transparent conductive layer 114 to the other second electrode 116 is defined as a second axis intercrossed with the first axis. The second axis is a Y axis as shown in FIG. 2. In one embodiment, the X axis is substantially perpendicular to the Y axis.

Specifically, the two first electrodes 115 and the two second electrodes 116 can be located on a same surface of the transparent conductive layer 114 or a same surface of the upper substrate 112. The two first electrodes 115 and the two second electrodes 116 also can be located on different surfaces of the transparent conductive layer 114. Materials of the two first electrodes 115 and the two second electrodes 116 can be metal, carbon nanotubes, or any other electrically conductive materials. In one embodiment, the materials of the two first electrodes 115 and the two second electrodes 116 are silver paste.

The protective layer 118 can cover the two first electrodes 115 and the two second electrodes 116. A material of the protective layer 118 is a transparent material. The transparent material can be silicon nitrides, silicon dioxides, benzocyclobutenes, polyester films, or polyethylene terephthalates. The protective layer 118 can be made of slick plastic and can receive a surface hardening treatment to protect the transparent conductive layer 114 from being scratched. In one embodiment, the protective layer 118 can be PET.

The upper electrode 124 can cooperate with a lower electrode (i.e., the pixel electrode) to apply a voltage on the liquid crystal layer 140 located between the upper electrode 124 and the lower electrode. A material of the upper electrode 124 can be indium tin oxide (ITO) or other transparent conductive materials.

A lower surface of the upper alignment layer 122 is adjacent to the liquid crystal layer 140. The lower surface of the upper alignment layer 122 can define a plurality of substantially parallel straight upper grooves (not shown). The upper grooves align the orientation of liquid crystal molecules of the liquid crystal layer 140. A material of the upper alignment layer 122 can be polystyrene and its derivatives, polyimide, polyvinyl alcohol, polyester, epoxy resin, polyurethane, polysilane, and other suitable materials. The upper grooves can be made by a scratching method, a SiOx-depositing method, or a micro grooves treating method. In one embodiment, the upper alignment layer 122 is made of polyurethane and has a thickness of about 1 micron to about 50 microns.

A thickness of the liquid crystal layer 140 can be about 1 micron to about 50 microns. In one embodiment, the thickness of the liquid crystal layer 140 is about 5 microns. The liquid crystal layer 140 includes a plurality of cigar shaped liquid crystal molecules. Understandably, the liquid crystal layer 140 can also be made of other suitable materials. The liquid crystal molecules can vary aligned directions thereof under different electrical fields.

The lower alignment layer 132 can include a plurality of substantially parallel straight lower grooves. A length direction of the lower grooves is substantially perpendicular to a length direction of the upper grooves. Material and function of the lower alignment 132 are the same as that of the upper alignment layer 122. In one embodiment, the lower alignment layer 122 is made of polyurethane and has a thickness of about 1 micron to about 50 microns.

The thin film transistor panel 134 includes a lower substrate (not shown), a plurality of thin film transistors (not shown) formed on the lower substrate, a plurality of pixel electrodes (not shown), a plurality of source lines (not shown), and a plurality of gate lines 228 (not shown). The plurality of thin film transistors are corresponding to the plurality of pixels one by one. Each of the thin film transistors electrically connects to the drive circuit through one of the source lines and one of the gate lines. In one embodiment, the thin film transistors and the pixel electrodes are aligned on the lower substrate.

The lower optical polarizer 136 can be made of dichroic/dichromatic material or the carbon nanotube layer as the above-described transparent conductive layer 114. The thickness of the lower optical polarizer 136 can range from about 1 micron to 0.5 millimeters. The lower optical polarizer 136 polarizes the light emitted from a back-light unit disposed under the liquid crystal display screen 10. A polarizing direction of the lower optical polarizer 136 is substantially perpendicular or substantially parallel to a polarizing direction of the transparent conductive layer 114. In one embodiment, the lower optical polarizer 136 can be the carbon nanotube layer with the carbon nanotubes. The carbon nanotubes in the lower optical polarizer 136 are substantially aligned along a same direction and substantially perpendicular to the carbon nanotubes in the transparent conductive layer 114.

Figure 4:
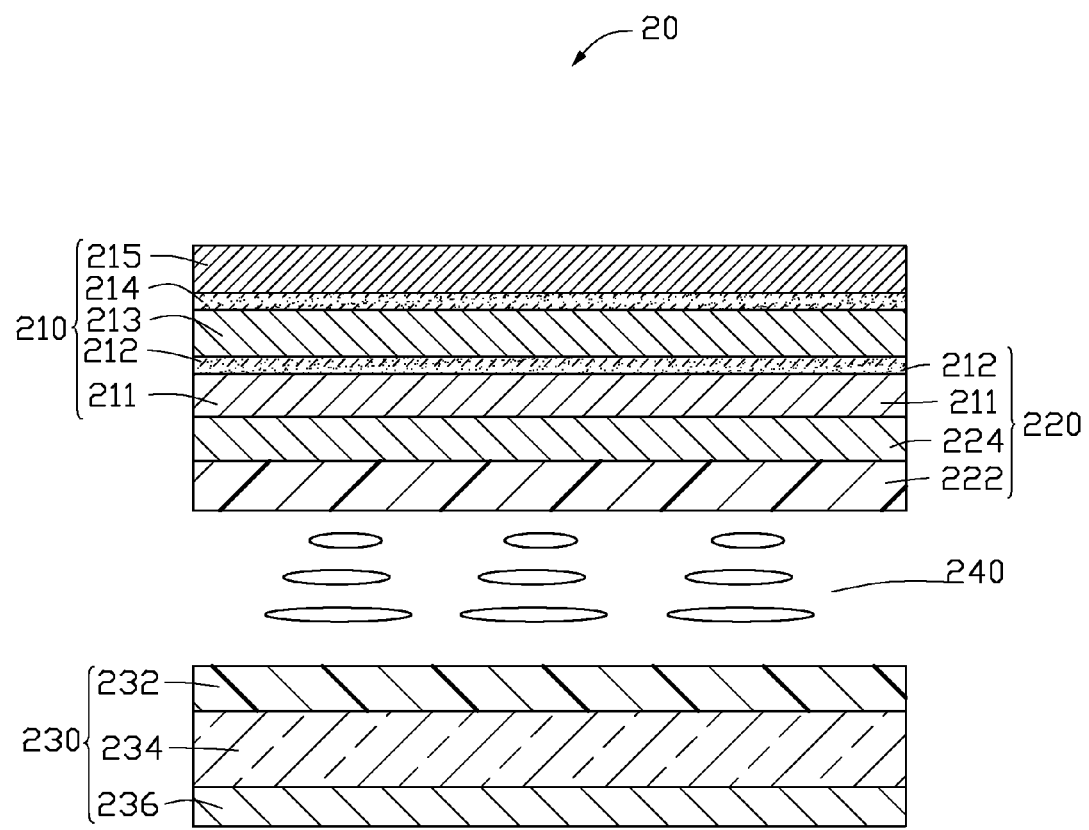
FIG. 4 is a cross sectional view of another embodiment of a liquid crystal display screen.
Figure 5:
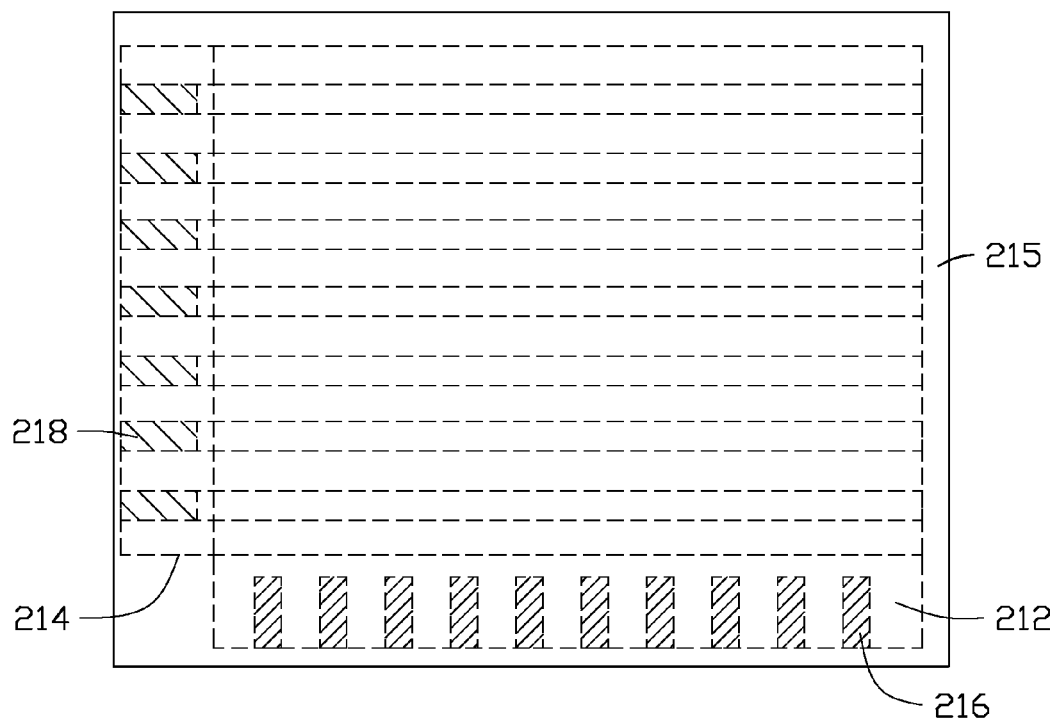
FIG. 5 is a top view of the liquid crystal display screen shown in FIG. 4.

Referring to FIG. 4 and FIG. 5, one embodiment of a liquid crystal display screen 20 is provided. The liquid crystal display screen 20 includes a capacitance touch panel 210, an upper board 220, a lower board 230 opposite to the upper board 220, and a liquid crystal layer 240 sandwiched between the upper board 220 and the lower board 230. The upper board 220 orderly includes the transparent conductive layer 214, the upper substrate 212, an upper electrode 224 and an upper alignment layer 222, from top to bottom. From top to bottom, the lower board 230 includes a lower alignment layer 232, a thin film transistor panel 234 and a lower optical polarizer 236 in sequence. The lower alignment layer 232 is adjacent to the liquid crystal layer 240.

The liquid crystal display screen 20 is similar to the liquid crystal display screen 10, except that the touch panel 210 is a capacitive coupling type touch panel. The touch panel 210 includes, from bottom to top in sequence, an upper substrate 211, a first transparent conductive layer 212, an insulating layer 213, a second transparent conductive layer 214, and a protective layer 215. The touch panel 210 also includes a plurality of first electrodes 216 and a plurality of second electrodes 218. The plurality of first electrodes 216 is electrically connected to the first transparent conductive layer 212, and located on a first peripheral region of the first transparent conductive layer 212. The first peripheral region extends substantially along a first axis defined as an X axis in FIG. 5. The plurality of second electrodes 218 is electrically connected to the first transparent conductive layer 212, and is located on a second peripheral region of the second transparent conductive layer 214. The second peripheral region extends substantially along a second axis defined as a Y axis in FIG. 5.

The upper substrate 211 and the insulating layer 213 are made of electrically insulated materials. Materials of the upper substrate 211 and the insulating layer 213 are the same as that of the upper substrate 112. The upper substrate 211 functions as a common substrate of the touch panel 210 and the upper board 220. Thus, the liquid crystal display screen 20 can be thinner and require fewer elements while retaining the same function.

The first transparent conductive layer 212 can be the above mentioned carbon nanotube layer in the liquid crystal display screen 10. That is, the first transparent conductive layer 212 includes a plurality of carbon nanotubes substantially arranged along a same direction. The first transparent conductive layer 212 can function as an electrical and an optical polarizer. Therefore the first transparent conductive layer 212 can also be configured to be an upper optical polarizer of the upper board 220. Simultaneously, the first conductive layer 212 can be an optical polarizer in the upper board 220. In one embodiment, the first transparent conductive layer 212 includes a single carbon nanotube film. The single carbon nanotube film includes a plurality of carbon nanotubes substantially along the Y axis. The resistant conductivity of the first transparent conductive layer 212 along the Y axis is smaller than resistant conductivities of the transparent conductive layer 212 along other directions. The resistant conductivity of the first transparent conductive layer along the X axis perpendicular to the Y axis is the largest of all the resistant conductivities of the first transparent conductive layer along all the directions.

The first electrodes 213 are spaced from each other along the X axis. The first transparent conductive layer 212 can have an excellent electrical conductivity along the Y axis. Thus, the first transparent conductive layer 212 can be considered as a plurality of spaced conductive strips. Each conductive strip extends along the Y axis. The conductive strips are electrically connected to the first electrodes 213 one by one. Materials of the first electrodes 213 can be electrical materials, such as metal. It can be understood that, the first transparent conductive layer 212 can be treated with a laser to form a plurality of laser cutting lines along the Y axis. Thus, the anisotropic electrical conductive property of the first transparent conductive layer 212 can be strengthened.

The second transparent conductive layer 214 includes a plurality of patterned conductive structures (not labeled). The conductive structures are spaced from each other, and extend along the X axis. The patterned conductive structures are substantially parallel to each other along the Y axis. Electrically conductive directions of the second transparent conductive layer 214 are substantially perpendicular to the direction of the first transparent conductive layer 212 having a minimal resistant conductivity. In one embodiment, the second transparent conductive layer 214 can be a patterned ITO film with a plurality of strip-shaped conductive structures. The electrically conductive directions of the strip-shaped conductive structures are substantially perpendicular to the carbon nanotubes extending directions in the first transparent conductive layer 212.

It can be understood that the material of the second transparent conductive layer 214 also can be carbon nanotube, or other transparent conductive material.

The second electrodes 218 are spaced from each other along the Y axis, and are electrically connected to the conductive structures one by one. Each second electrode 218 extends along the X axis. Materials of the second electrodes 218 are the same as that of the first electrodes 216.

The insulating layer 213 separates the first transparent conductive layer 212 and the second transparent conductive layer 214. The conductive strips of the first transparent conductive layer 212 are intercrossed with the conductive structures of the second transparent conductive layer 214 to form a plurality of intercrossed positions. A capacitance can be formed between each of the plurality of intercrossed positions. The capacitance connects with an outer electrical circuit by one of the first electrodes 216 and one of the second electrodes 218. When a finger or other touch tools touch a point close to one or more of the intercrossed positions, the capacitance formed between the one or more of the intercrossed positions will change. The outer electrical circuit can detect the change of the capacitance. Therefore, the point can be detected.

It can be understood that the first transparent conductive 212 can be made of ITO, while the second transparent conductive 214 can be made of the above mentioned carbon nanotube layer.

The material and the structure of the protective layer 215 are the same as that of the protective layer 118.

According to the above descriptions, the liquid crystal display screens of the present disclosure can have some advantages. The upper substrate can be configured to function as a substrate of the touch panel and a substrate of the upper board at the same time. The carbon nanotube layer has electrical conductivity and optical polarizing properties, thus the carbon nanotube layer can function as the transparent conductive layer in the touch panel and the upper optical polarizer in the upper board. Thus, the liquid crystal display screens can omit two elements and still maintain the same functions, while the structures of the liquid crystal display screens are simplified. The thicknesses of the liquid crystal display screens can be decreased. The utilization efficiencies of the liquid crystal display screens can be improved, and a quality of the liquid crystal display screens can also be improved.

It is to be understood that the above-described embodiment is intended to illustrate rather than limit the disclosure. Variations may be made to the embodiment without departing from the spirit of the disclosure as claimed. The above-described embodiments are intended to illustrate the scope of the disclosure and not restricted to the scope of the disclosure.

It is also to be understood that the above description and the claims drawn to a method may include some indication in reference to certain steps. However, the indication used is only to be viewed for identification purposes and not as a suggestion as to an order for the steps.

What is claimed is:

1. A liquid crystal display screen, comprising:
   a capacitance type touch panel comprising a substrate and a transparent conductive layer located on the substrate, the transparent conductive layer being a carbon nanotube layer having an anisotropic conductivity, the carbon nanotube layer comprising a plurality of carbon nanotubes substantially arranged along a same extending direction;
   an upper board comprising an upper substrate, an upper electrode, and an upper alignment layer, wherein the transparent conductive layer functions as an upper optical polarizer of the upper board, and the upper substrate is the substrate of the capacitance type touch panel;
   a liquid crystal layer; and
   a lower board comprising a lower alignment layer, a thin film transistor panel, and a lower optical polarizer.

2. The liquid crystal display screen of claim 1, wherein most of the plurality of carbon nanotubes are joined end-to-end by van der Waals attractive force therebetween along the extending direction.

3. The liquid crystal display screen of claim 1, wherein a resistant conductivity of the carbon nanotube layer along the extending direction is smaller than resistant conductivities of the carbon nanotube layer along other directions.

4. The liquid crystal display screen of claim 3, wherein a resistant conductivity ratio between the resistant conductivity of the carbon nanotube layer along the extending direction and the resistant conductivities of the carbon nanotube layer along other directions is less than or equal to 1:2.

5. The liquid crystal display screen of claim 1, wherein the carbon nanotube layer further comprises a reinforcement material infiltrated in the plurality of carbon nanotubes.

6. The liquid crystal display screen of claim 5, wherein the upper substrate is the only substrate of the capacitance type touch panel and the upper board.

7. The liquid crystal display screen of claim 6, wherein the transparent conductive layer is the only upper optical polarizer for the upper board.

8. The liquid crystal display screen of claim 1, wherein the capacitance type touch panel further comprises at least two electrodes electrically connecting to the transparent conductive layer.

9. The liquid crystal display screen of claim 1, wherein a material of the upper substrate is polycarbonate (PC), polymethyl methacrylate acrylic (PMMA), polyethylene terephthalate (PET), polyether polysulfones (PES), polyvinyl polychloride (PVC), benzocyclobutenes (BCB), polyesters, or acrylic resins.

10. The liquid crystal display screen of claim 1, wherein a material of the upper substrate is glass, diamond, or quartz.

11. A liquid crystal display screen, comprising:
a capacitance type touch panel comprising a first substrate, a first transparent conductive layer, an insulating layer, and a second transparent conductive layer;
an upper board comprising, an upper substrate, an upper electrode, an upper alignment layer,
a liquid crystal layer; and
a lower board comprising a lower alignment layer, a thin film transistor panel, and a lower optical polarizer,
wherein one of the first transparent conductive layer and the second transparent conductive layer is a carbon nanotube layer having anisotropic conductivity, the carbon nanotube layer has optical polarizing properties and functions as an upper optical polarizer of the upper board, and the other of the first transparent conductive layer and the second transparent conductive layer comprises a plurality of conductive strip structures extending along a first direction, the first direction being intercrossed with a second direction, and the upper substrate is a second substrate of the capacitance type touch panel.

12. The liquid crystal display screen of claim 11, wherein the plurality of carbon nanotubes substantially extends along the second direction and is joined end-to-end by van der Waals attractive force therebetween.

13. The liquid crystal display screen of claim 11, wherein the carbon nanotube layer further comprises a reinforcement material infiltrated in the plurality of carbon nanotubes.

14. The liquid crystal display screen of claim 11, wherein the carbon nanotube layer has a plurality of laser cutting lines extending along the second direction.

15. The liquid crystal display screen of claim 11, wherein a resistant conductivity of the carbon nanotube layer along the second direction is less than resistant conductivities of the carbon nanotube layer along other directions.

16. The liquid crystal display screen of claim 11, wherein the first transparent conductive layer is the carbon nanotube layer, a resistant conductivity ratio between a resistant conductivity of the carbon nanotube layer along the second direction and resistant conductivities of the carbon nanotube layer along other directions is less than or equal to 1:2.

17. The liquid crystal display screen of claim 16, wherein the second transparent conductive layer comprises the plurality of conductive strip structures extending along the first direction, the plurality of conductive strip structures is separately arranged along the second direction, the first direction is substantially perpendicular to the second direction.

18. The liquid crystal display screen of claim 11, wherein the capacitance touch panel further comprises a plurality of first electrodes and a plurality of second electrodes, the plurality of first electrodes are separately located on the first transparent conductive layer along the first direction and electrically connected to the first transparent conductive layer, and the plurality of second electrodes are separately located on the second transparent conductive layer along the second direction and electrically connected to the plurality of conductive strip structures one by one.

19. The liquid crystal display screen of claim 10, wherein a material of the second transparent layer is carbon nanotube or indium tin oxide.

20. A liquid crystal display screen comprising: a touch panel comprising a carbon nanotube layer having anisotropic conductivity and comprising a plurality of carbon nanotubes substantially extending along a same direction, and an upper board comprising an upper substrate, wherein the carbon nanotube layer functions as a transparent conductive layer of the touch panel and an upper optical polarizer of the upper board, and the upper substrate is also configured to be a substrate of the touch panel.

* * * * *